June 19, 1973  T. C. JONES ET AL  3,740,293
TIRE BUILDING MACHINE
Filed May 17, 1971  12 Sheets-Sheet 1

INVENTORS
THOMAS C. JONES
ARMINDO CANTARUTTI

Oberlin, Maky, Donnelly & Renner
ATTORNEYS

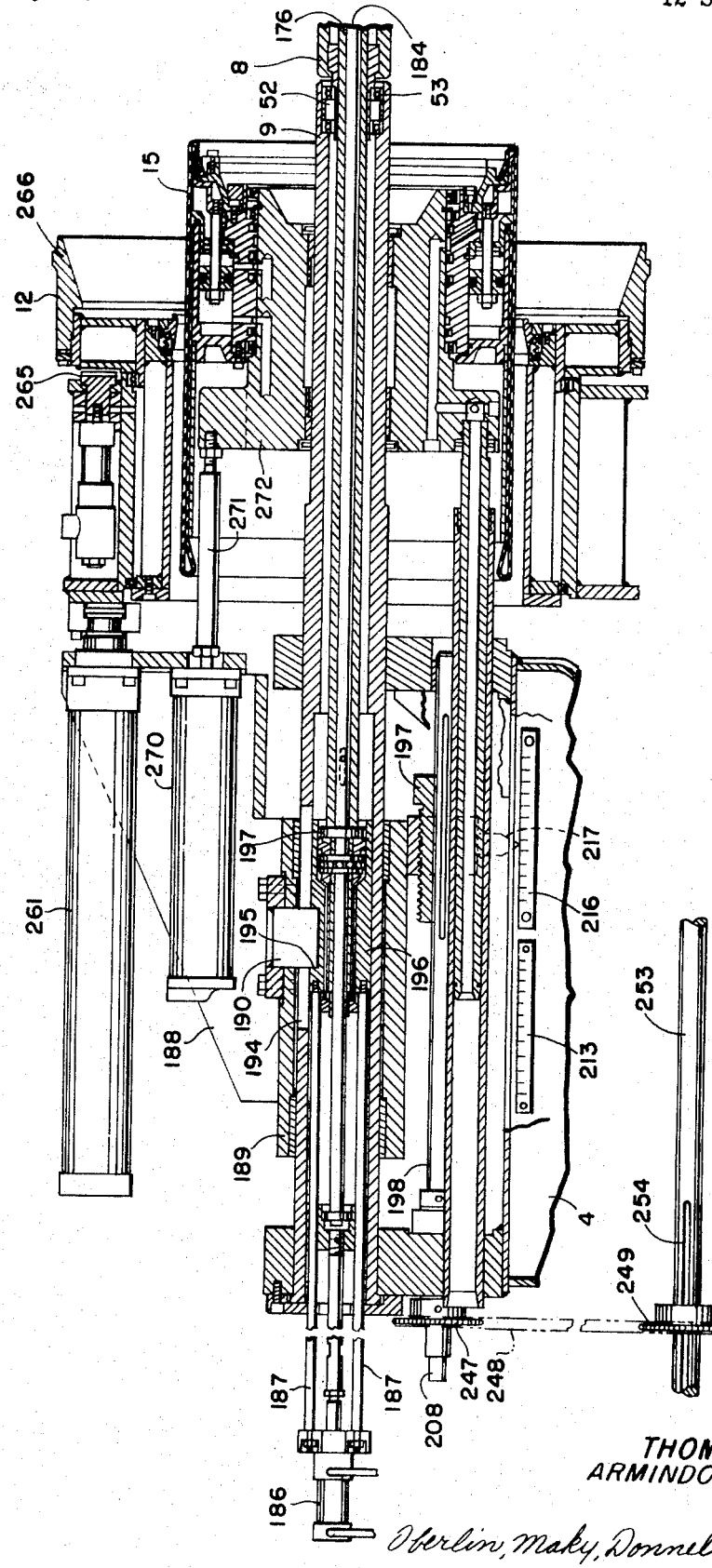

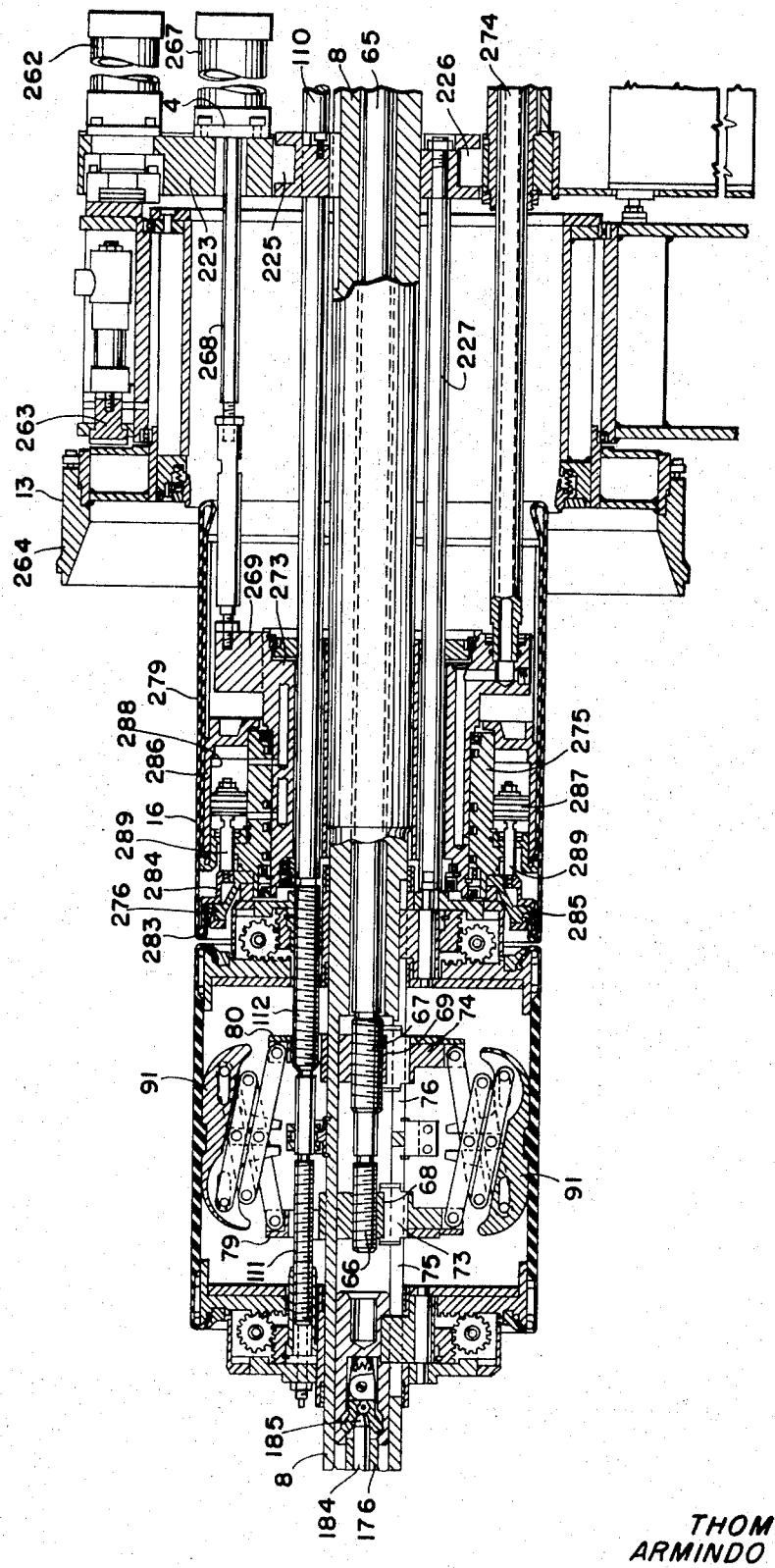

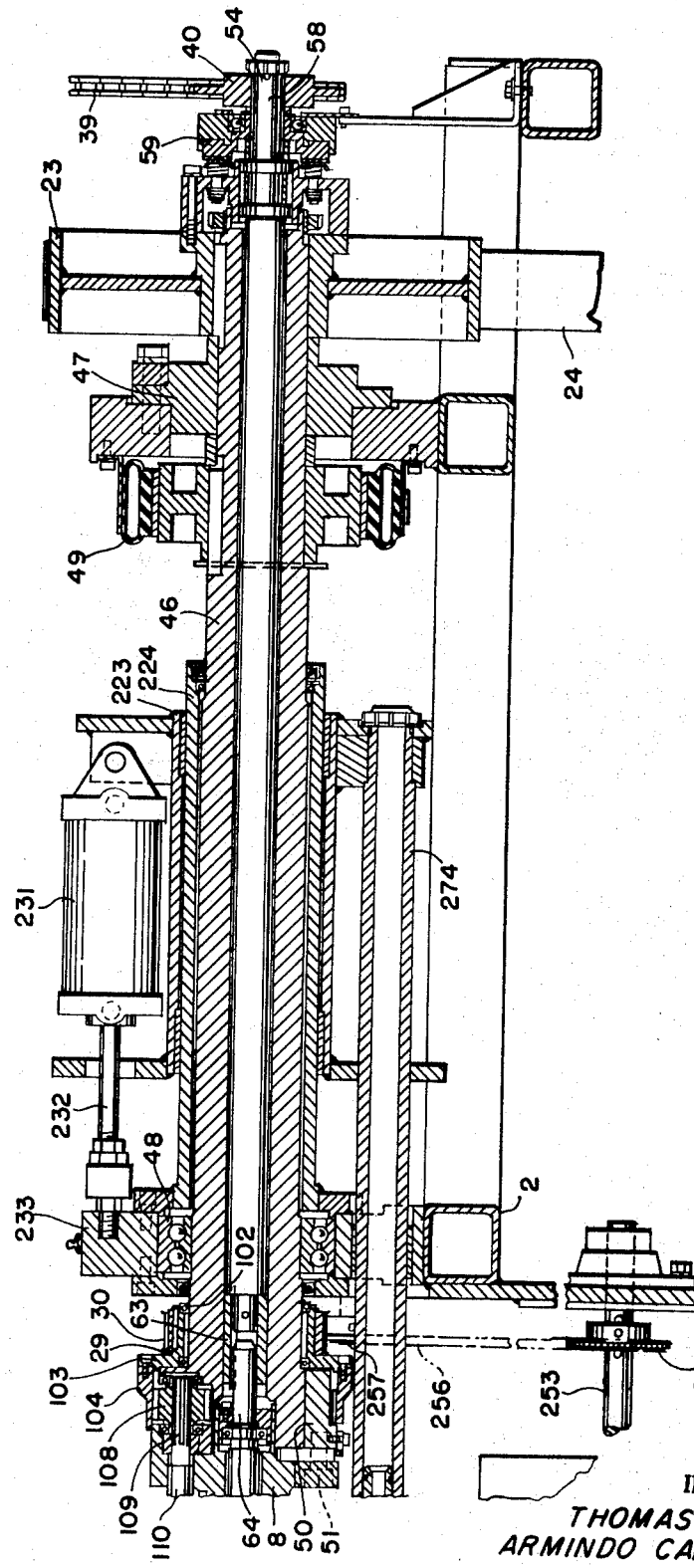

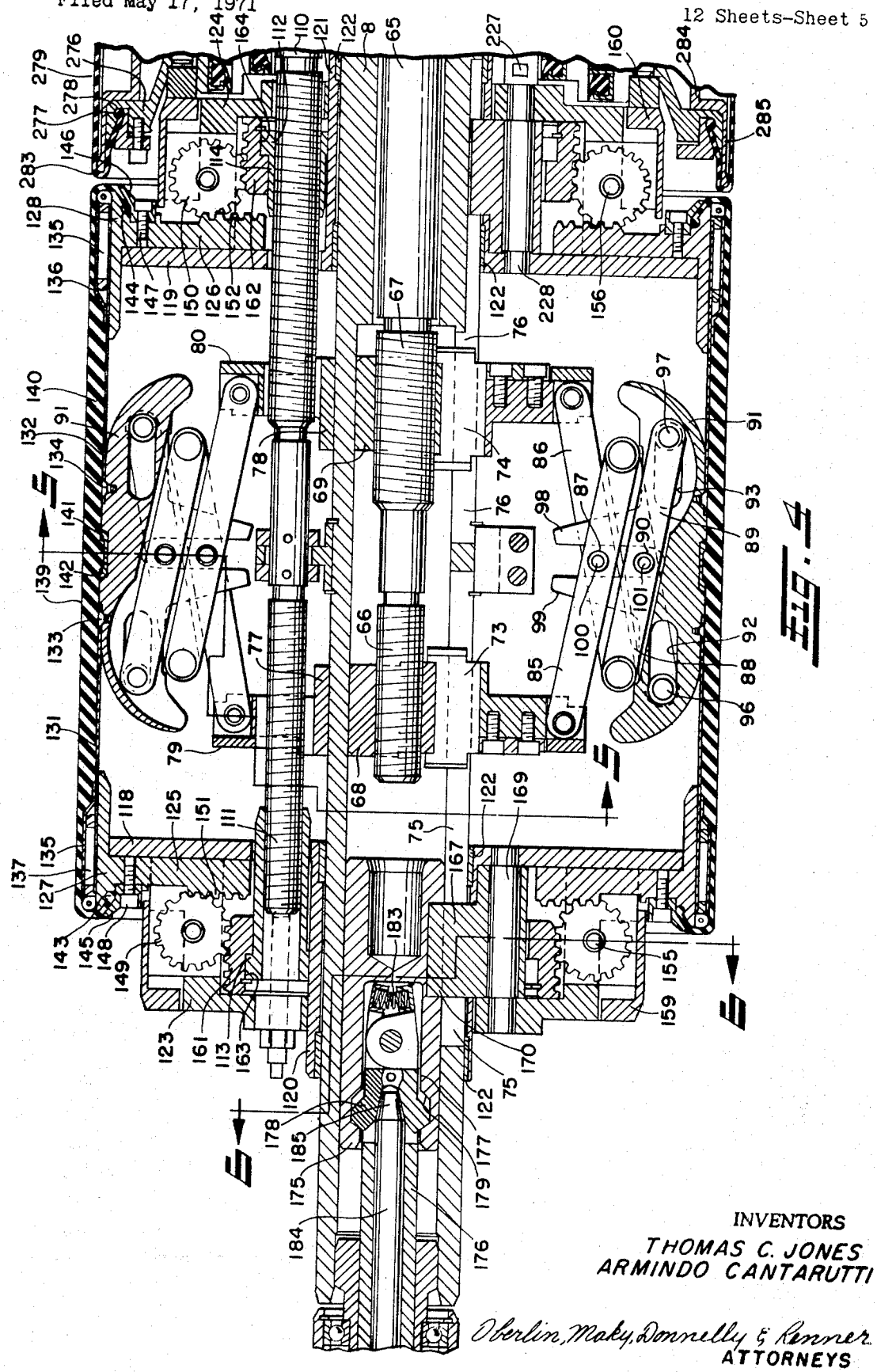

INVENTORS
THOMAS C. JONES
ARMINDO CANTARUTTI

Oberlin, Maky, Donnelly & Renner
ATTORNEYS

June 19, 1973  T. C. JONES ET AL  3,740,293
TIRE BUILDING MACHINE

Filed May 17, 1971  12 Sheets-Sheet 8

INVENTORS
THOMAS C. JONES
ARMINDO CANTARUTTI

Oberlin, Maky, Donnelly & Renner
ATTORNEYS

INVENTORS
THOMAS C. JONES
ARMINDO CANTARUTTI

Oberlin, Maky, Donnelly & Renner
ATTORNEYS

June 19, 1973 T. C. JONES ET AL 3,740,293
TIRE BUILDING MACHINE
Filed May 17, 1971 12 Sheets-Sheet 11

INVENTORS
THOMAS C. JONES
ARMINDO CANTARUTTI

Oberlin, Maky, Donnelly & Renner
ATTORNEYS

United States Patent Office 3,740,293
Patented June 19, 1973

3,740,293
TIRE BUILDING MACHINE
Thomas C. Jones, Salem, and Armindo Cantarutti, Akron, Ohio, assignors to NRM Corporation, Akron, Ohio
Filed May 17, 1971, Ser. No. 143,846
Int. Cl. B29h 17/16, 17/26
U.S. Cl. 156—415                    31 Claims

ABSTRACT OF THE DISCLOSURE

A tire building machine having an expandable drum with separate crown and shoulder drives for controlling the movement of the crown and shoulder portions to shape the plies to the full tire shape and maintain uniform spacing of the cords. The outboard end of the drum is supported by and latched to a tailstock tube for the transfer of axial forces from the tailstock to the drum during the building operation. Axial movement of the drum shoulders is adjustably controlled by interconnected adjustable stops mounted on the tailstock and main housing with piston cylinder assemblies resisting movement of the shoulders in different directions to control radial expansion and contraction of the shoulders during the building operation in cooperation with the shoulder drive.

---

This invention relates generally as indicated to an expandable and collapsible tire building drum mechanism which is especially adaptable for building and shaping radial cord tires.

In the manufacture of radial tires two general methods have been used. One method is called the "two-stage" procedure in which a belt of radial cord plies with edges turned around beads is built on a conventional tire building drum. It is then removed from the drum and placed on an expandable drum where it is shaped to toroidal form after which the belts, sidewall and tread are applied.

The other method is the "one-stage" procedure where the plies are laid directly on an expandable drum and turned over the beads after which the tire carcass is shaped by expanding the drum and then the belts, sidewalls and tread are applied to the tire on the same drum. The two-stage method was used originally because the same tire building equipment which had been used for building conventional bias cord tires could be used for building the first stage and the expandable drum for the second stage operation was not required to support the tire for stitching and other building operations in the cylindrical shape. It was found, however, that during transfer of the tire carcass from the first stage machine to the second stage machine there was distortion of the cords and furthermore there was difficulty in placing the tire accurately on the second drum for shaping. A much better precision made tire could be built on a one-stage machine where the tire need not be handled and then set up on a second machine.

As stated heretofore, the expandable drum for a one-stage tire building machine must provide sufficient support for building the tire in the cylindrical shape before shaping. This includes stitching the plies together and applying the bead with proper turnup or turndown of the plies around the beads. A one-stage tire building machine which has provided these features is shown in recently issued Pat. No. 3,560,301 on "Tire Building Machine," issued Feb. 2, 1971, to one of the applicants of this patent application. An expandable drum providing a firm cylindrical surface on which the plies can be assembled and also a firm toroidal surface after expansion is shown in copending application Ser. No. 28,281, filed Apr. 22, 1970, which is a continuation of application Ser. No. 617,658, filed Feb. 21, 1967, now abandoned, on "Tire Building Machine," and assigned to the assignee of this application.

In general, tire building machines of this type have been found to operate satisfactorily but heretofore no provision has been made to expand the tire into a toroidal shape so that during expansion the radial cords are not stretched or otherwise distorted. Also the expanding mechanism has limited the expansion to a shape with the beads spread apart a substantial distance and did not permit movement of the beads closer to a normal fully shaped tire position. It has also been a problem obtaining initial expansion of the drum shoulders and limiting the movement of the drum shoulders from the outer bead set position to the inner shaped position without the introduction of extra components which would fit in the limited space available. Mechanism is also required to withdraw the drum sidewalls from the tire sidewalls after the tire is built and, here again, there is a space problem. The control of the drum shoulder involves movement of the drum ends from the tailstock and heretofore this has been done through mechanism extending around the tailstock connection to the drum shaft because this connection has to be broken to remove the finished tire and insert the beads in the bead setters.

The use of bladders for turning up the plies around the beads has also proved to be satisfactory; however, there has been a problem due to initial movement of the bladder away from the bead preventing the radial movement of the ply into engagement with the beads.

It is, accordingly, a principal object of this invention to provide a tire building machine including precise control of the expansion of the drum to a toroidal shape.

Another object is to provide for independent control and movement of the crown expanding mechanism and of the shoulder manipulating mechanism.

Still another object is to provide sensing and feedback controls for expanding and shaping the tire building drum.

A further object is to provide such a tire building machine with a separate shoulder drive which will not only move the drum ends axially towards and away from the center but will provide the power for initial expansion of the shoulders.

A still further object is to provide a drum shoulder movement control for limiting the movement of the ends of the drum and also manipulating the expansion and contraction of the shoulders in cooperation with the shoulder drives.

Another object is to provide a drum expanding mechanism permitting substantial movement of the beads toward the center of the drum to obtain a tire shape which is closer to the finished tire configuration.

Still another object is to provide a more direct connection of the shoulder movement control mechanism in the tailstock with the end members of the drum while at the same time permitting retraction of the tailstock for removal of the tire.

A still further object is to provide for retraction of the drum sidewall from the sidewall of the completely built tire while maintaining the crown diameter prior to removal of the tire from the tire building machine.

Another object is to provide for initial radial expansion of the bladder margin adjacent the bead to urge the plies radially into engagement with the inner faces of the beads during turnup of the plies around the beads.

These and other objects of the present invention may be achieved by providing a tire building machine with an expandable drum having separate drives for expanding and collapsing the crown sectors and for manipulating the shoulder portions of the drum. The drives have variable speed controls with sensing and feedback apparatus for precise control of the shaping operation. The crown sectors are expanded by a double toggle linkage which provides substantial extension of the sectors while requiring limited space for operation and thereby permits movement of the beads toward the center of the drum.

Drum shoulder movement is limited by stops in the tailstock and main housing which engage movable shoulder adjusting carriages slidably mounted for relative axial movement and connected to the drum ends. Holding cylinders on the carriages are operable in conjunction with the driving movement of the shoulder drive to provide for expansion and contraction of the shoulders. A latch connection of the tailstock tube to the drum shaft provides a direct connection between the tailstock shoulder adjusting carriage and the drum ends while permitting retraction of the tailstock.

The pressure of bladder insert rings in the bladder margins adjacent the beads causes initial radial movement of the plies into engagement with the inner peripheries of the beads provides a tight ply turnup around the beads.

To the accomplishment of the foregoing and related ends, the invention, then, comprises the features hereinafter fully described and particularly pointed out in the claims, the following description and annexed drawings setting forth in detail a certain illustrative embodiment of the invention, this being indicative, however, of but one of the various ways in which the principle of the invention may be employed.

Figure 2:
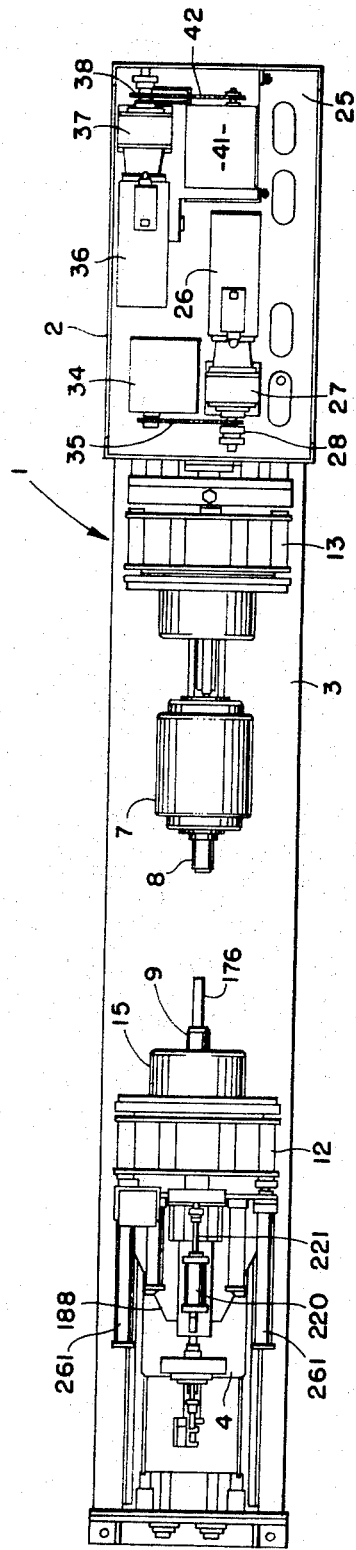
FIG. 2 is a schematic top plan view of the tire building machine of FIG. 1 as seen from the plane of line 2—2 thereof.
Figure 1:
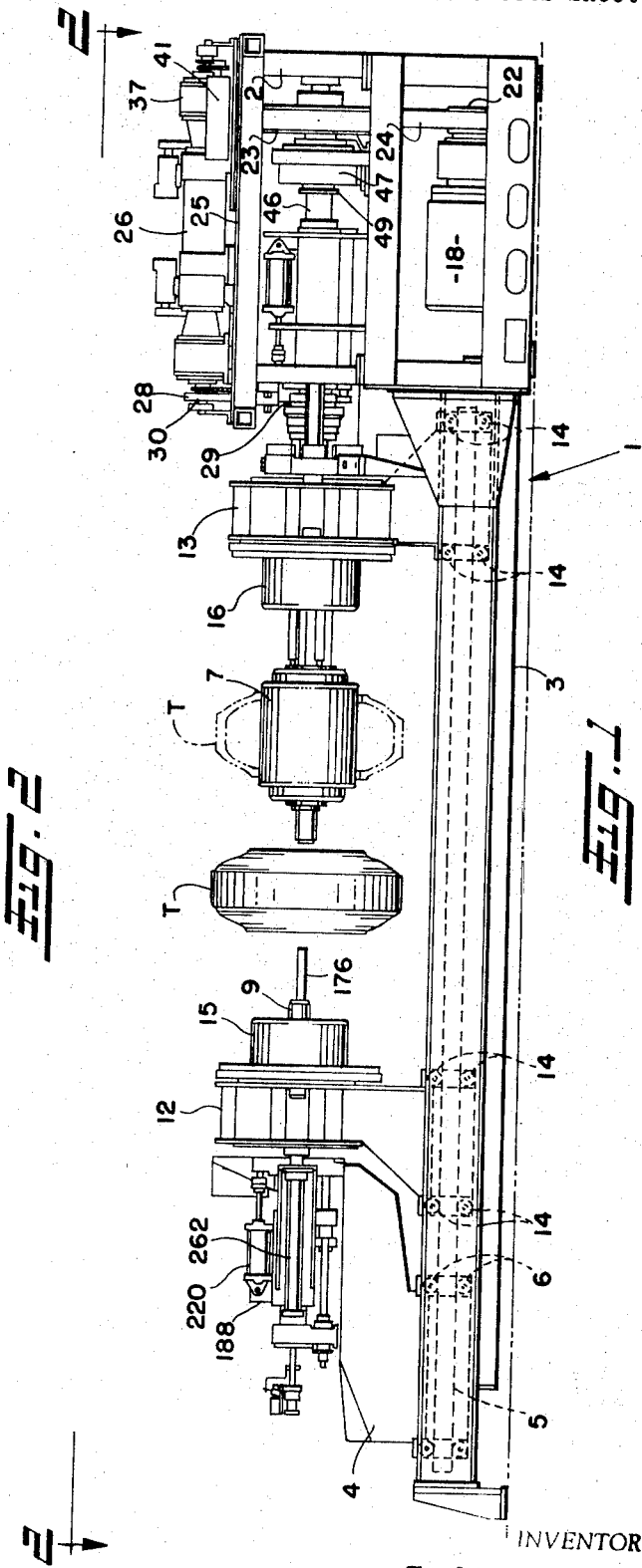
FIG. 1 is a schematic front elevation view of a preferred form of tire building machine constructed in accordance with this invention and with the stitcher assembly not shown.
Figure 5:
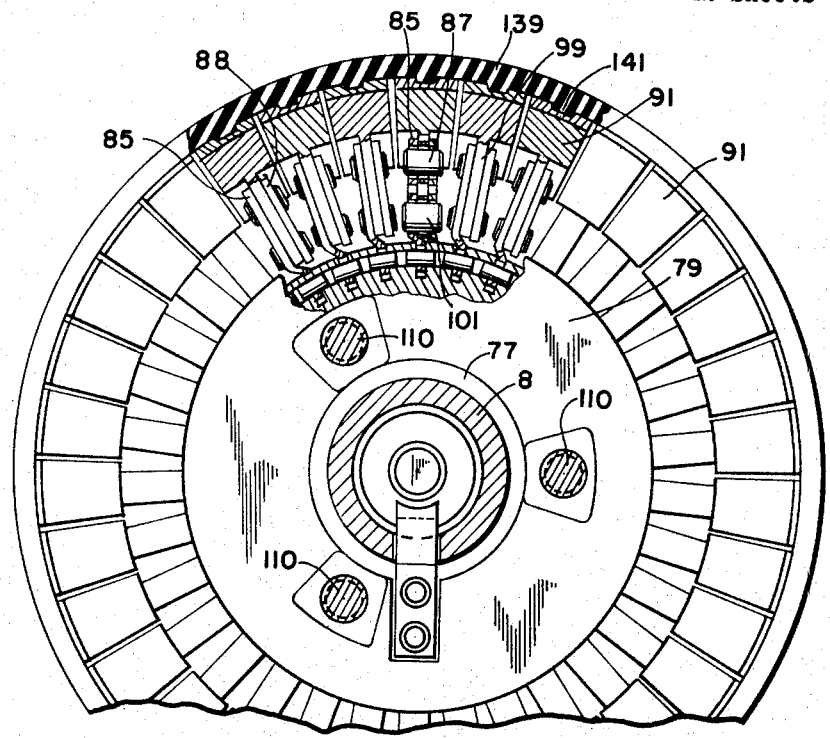
Figure 6:
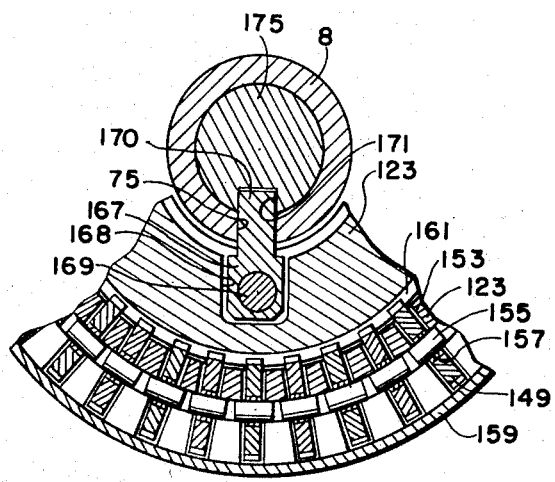
Figure 7:
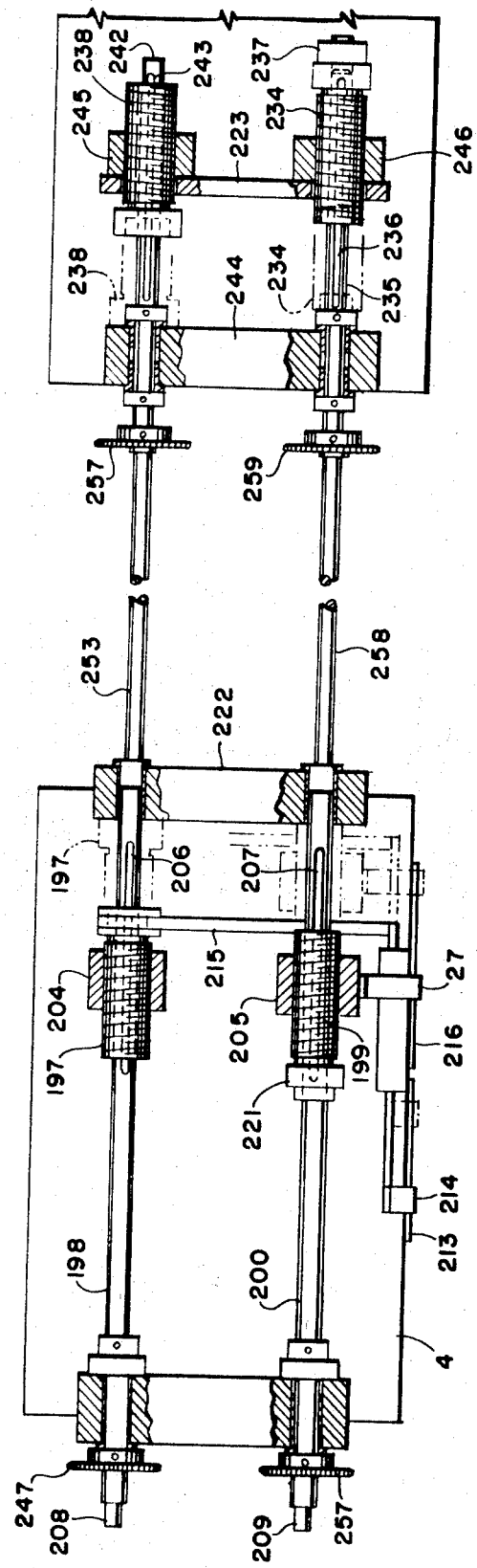
Figure 17:
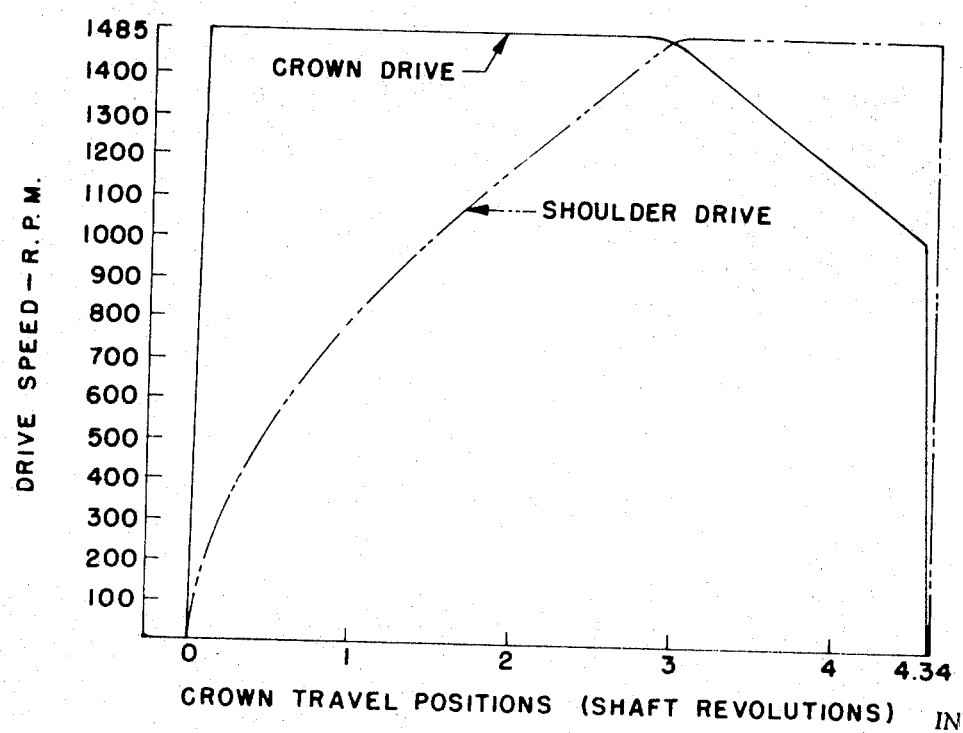

FIGS. 3A, 3B and 3C constitute an enlarged fragmentary longitudinal section of the tire building machine shown in FIGS. 1 and 2;

FIG. 4 is a further enlargement of the drum mechanism shown in FIG. 3B with parts being broken away;

FIG. 5 is a transverse sectional view of the crown expanding mechanism taken along the plane of line 5—5 of FIG. 4 with parts being broken away;

FIG. 6 is a fragmentary transverse sectional view of the drum shoulder mechanism taken along the plane of line 6—6 of FIG. 4;

FIG. 7 is a schematic top plan view of the shoulder adjusting mechanism, parts being sectioned and broken away;

FIGS. 8 through 16 are fragmentary schematic longitudinal sections similar to FIG. 4 but illustrating the preferred sequence of operation of the tire building machine of the present invention during the manufacture of a tire carcass;

FIG. 17 is a graph showing the speed of rotation of the crown drive and shoulder drive at different crown travel positions during the drum expansion cycle for a typical radial tire carcass.

Referring now in detail to the drawings and first, especially to FIGS. 1 and 2, there is shown by way of example a tire building machine 1 in accordance with this invention including a main housing 2 at one end containing the drive mechanisms and necessary controls for operating the machine as required. A center base assembly 3 is mounted on the main housing 2 and extends to the outboard end of the tire building machine 1 where it supports a tailstock housing 4 on parallel rails 5 which are engaged by rollers 6 on the tailstock housing. The tailstock housing 4 may be moved toward and away from the main housing 2 by suitable power means such as a hydraulic cylinder piston assembly, not shown.

An expandable drum 7 is mounted on a tire drum shaft 8 projecting from the main housing 2 toward the tailstock housing 4. The tailstock tube 9 projects toward the main housing 2 from the tailstock housing 4 and is movable into engagement with the tire drum shaft 8 for supporting the drum 7 during the building operation.

An outer bead setter assembly 12 and an inner bead setter assembly 13 are slidably mounted on the rails 5 for movement toward and away from the drum 7 and have rollers 14 in engagement with the rails.

An outer bladder turnup assembly 15 is mounted on the tailstock housing 4 and extends through the outer bead setter assembly 12 and around the tailstock tube 9. An inner bladder turnup assembly 16 is mounted on the main housing 2 and extends through the inner bead setter assembly 13 and around the tire drum shaft 8.

In FIGS. 1 and 2, the tire building machine 1 is shown in the open position with the tailstock housing 4 retracted and the tailstock tube 9 disengaged from the drum shaft 8. This is the position in which a completely assembled tire T may be removed from the drum 7 by moving the tire from the position shown in chain-dotted lines in FIG. 1 where it is supported on the drum 7 in the contracted position to the position shown in full lines where it can be removed from the machine.

During the building of a tire on this tire building machine 1, a stitcher assembly may be mounted adjacent the drum 7 for stitching the plies. A conventional stitcher assembly of a type well known in the art may be used as, for example, the stitcher assembly shown in U.S. Pat. No. 3,524,784 of G. E. Isaksson et al. on tire building machine issued Aug. 18, 1970. The stitcher assembly is not shown in the drawings of this application because the stitchers used with this machine do not constitute part of the invention described herein.

The expandable drum 7 is rotated by a main shaft drive motor 18 which turns a drive pulley 22 and a driven pulley 23 connected by a belt 24.

The main housing 2 has a supporting platform 25 on which a shoulder drive motor 26 is mounted in driving relationship with a speed reducer 27 for turning a shoulder drive pulley 28 driving a shoulder driven pulley 29 through a shoulder belt 30. A shoulder position sensing apparatus 34 is mounted on the platform 25 adjacent the speed reducer 27 and connected thereto by a chain sprocket drive 35 for controlling the speed of rotation of the drive as will hereafter be explained in detail.

A crown drive motor 36 is also mounted on the platform 25 and is in driving engagement with a crown speed reducer 37 for turning a driving sprocket 38 in engagement with a chain 39 for driving a driven sprocket 40 which is shown more clearly in FIG. 3C. A crown drive sensing apparatus 41 is also mounted on the platform 25 adjacent the speed reducer 37 and connected thereto by a chain sprocket drive 42 for controlling the speed of rotation of the crown drive in the manner to be explained in more detail hereinafter.

Referring further to FIGS. 1 and 2 and also to FIGS. 3A, 3B and 3C, a main shaft 46 is rotatably supported in the main housing by a pillow block 47 close to the driven pulley 23 and by a bearing 48 at the other end of the housing. A pneumatic drum brake 49 having a rotating part keyed to the main shaft 46 and a nonrotating part fastened to the pillow block 47 is disposed between the pillow block and main shaft for stopping and holding the drum 7 against rotation. As shown in FIG. 3C, the driven pulley 23 is mounted on the main shaft 46 and keyed thereto for driving engagement.

The main shaft 46 has a flanged end 50 to which the tire drum shaft 8 may be fastened as by screws 51.

The tailstock housing 4 as shown in FIG. 3A is in position with the tailstock tube 9 in engagement with the tire drum shaft 8. The tailstock tube 9 which is nonrotatably mounted in the tailstock housing 4 has a recessed opening 52 for receiving a bearing connecting member 53 at the end of the rotatable tire drum shaft 8.

Referring to FIG. 3C, a crown drive shaft 54 is disposed in the cylindrical main shaft 46 throughout the length of the main housing 2 and has an end portion 58 on which driven sprocket 40 is mounted and keyed to the shaft. A magnetic clutch 59 is also mounted on the end portion 58 and on the end of the main shaft 46 so that by engaging the clutch the crown drive shaft 54 will be rotated at the same speed as the main shaft where no relative turning movement of the shaft is desired. At the outboard end of the crown drive shaft 54 a serrated sleeve 63 is provided for receiving a serrated end portion 64 of a crown drive shaft extension 65 disposed within the tire drum shaft 8 as shown in FIGS. 3B and 4.

At the outboard end of the crown drive shaft extension 65 are spaced-apart threaded portions 66 and 67 within the drum 7 which are in threaded engagement with axially movable supporting members such as nuts 68 and 69 located within the cylindrical drum shaft 8 and having radially extending arms 73 and 74 disposed in slots 75 and 76 in the wall of the drum shaft 8. The arms 73 and 74 are connected to sleeves 77 and 78 in sliding engagement with the outer surfaces of the drum shaft 8 and supporting flanges 79 and 80 to which inner crossed links 85 and 86 are pivotally connected at an inner pivotal connection 87. The outer ends of the inner crossed links 85 and 86 are pivotally connected to the inner ends of outer crossed links 88 and 89 at an outer pivotal connection 90. Each of the inner crossed links 85 and 86 which are connected to outer crossed links 88 and 89 are in turn connected to a crown sector 91 having axially extending slots 92 and 93 for receiving pins 96 and 97 in the outer ends of the outer crossed links for sliding pivotal movement to stabilize and guide the radial movement of the crown sector.

As shown more clearly in FIG. 4, the crown sector 91 has spaced-apart fingers 98 and 99 extending radially inward from the sectors and receives pin 100 of the inner pivotal connection 87 and pin 101 of the outer pivotal connection 90. The inner crossed links 85 and 86 are spaced apart so that the fingers 98 and 99 extend between the links and the outer crossed links 88 and 89 are also spaced apart at the outer pivotal connection 90 so that the fingers 98 and 99 extend between the links.

The threaded portions 66 and 67 of the crown drive shaft extension 65 have flights of opposite hand so that when the shaft extension 65 is turned in one direction the nuts 68 and 69 will move outward from the center of the drum 7 and when the shaft extension is rotated in the opposite direction the nuts 68 and 69 will move toward the center. This will cause the flanges 79 and 80 to move axially and result in radial movement of each crown sector 91. This turning movement of the crown drive shaft extension 65 is transmitted from the crown drive shaft 54 driven by driven sprocket 40 while the magnetic clutch 59 is disengaged and the pneumatic drum brake 49 is engaged to hold the main shaft 46 and the drum shaft 8 stationary.

Referring now to FIG. 3C, shoulder driven pulley 29 is rotatably mounted on bearings 102 on the main shaft 46. The shoulder driven pulley 29 has a radial flange 103 supporting an internal ring gear 104. Three pinions 108 are disposed in meshing engagement with the internal ring gear 104 at positions 120° apart around the gear and are grooved internally for receiving the splined ends 109 of shoulder drive shafts 110 extending from the ring gear 104 to the drum 7. As shown in FIGS. 3B and 4, the shoulder drive shafts 110 have threaded portions 111 and 112 in driving engagement with nuts 113 and 114 of a shoulder segment expanding apparatus of the type shown and described in copending U.S. application Ser. No. 65,139, filed Aug. 19, 1970, for "Tire Building Machine," of Armindo Cantarutti, one of the applicants of this application.

This apparatus includes radially extending end members such as flanges 118 and 119 having central hub portions 120 and 121 for supporting the flanges on the drum shaft 8 with bushings 122 at both ends of the hub portions to facilitate axial movement of the ends of the drum toward and away from each other as desired. Attached to the axial outer face of the radial flanges 118 and 119 are annular housings 123 and 124 having a plurality of circumferentially spaced radially extending slots therein for receipt of radially inward extensions 125 and 126 from a plurality of radially movable drum segments 122 and 128. Although the number of drum segments 127 and 128 may vary, the drum 7 illustrated has thirty-six such segments at each end. These drum segments 127 and 128 are connected to the drum sectors 91 by flexible resilient spring members such as steel spring leaves 131 and 132. Each of the leaves 131 and 132 are fastened to the crown sector 91 by fasteners such as screws 133 and 134 and connected to the crown segments 127 and 128 by a sliding connection of the type shown and described in copending U.S. application Ser. No. 877,359, filed Nov. 17, 1969, now U.S. Pat. No. 3,647,598, on "Radial Tire Making Drum," which is assigned to the assignee of this application. These connections include bifurcated ends 135 and 136 of the spring leaves 131 and 132 which are in sliding engagement with hinged plates 137 and 138 pivotally mounted on the drum segments 127 and 128 to permit extension of the drum surface. The drum surface 7 has a cover 139 of resilient material which may be of natural rubber or polyurethane and may be reinforced with fabric or wire cords at the edges of a girdle portion 140 at the center of the drum. Radially extending nipples 141 on the inner surface of the girdle portion 140 are provided for insertion in recesses 142 in the outer faces of the crown segments 91 for centering of the cover 139. The edges of the cover 139 have beads 143 and 144 which are clamped to the side faces of the drum segments 127 and 128 as by clamping members 145 and 146 fastened by screws 147 and 148.

Radial movement of the drum segments 127 and 128 is obtained by actuation of a drum segment expanding and contracting mechanism including a plurality of pinions 149 and 150 rotatably mounted in the annular housings 123 and 124, one such pinion 149 and 150 being provided for each drum segment 127 and 128 and engaging a radial rack 151 and 152 on each extension 125 and 126. The pinions 149 and 150 are received in radial slots 153 and 154 in the annular housings 123 and 124 in axial alignment with the radial slots for the drum segment extensions 125 and 126 and the shafts 155 and 156 where the pinions 149 and 150 are received in additional slots 157 and 158 extending transversely of the other slots. An annular cover plate 159 and 160 completely surrounds the annular housings 123 and 124 and are secured to the housing by suitable fasteners. As is apparent, rotation of the pinions 149 and 150 in opposite directions causes the drum segments 127 and 128 to move radially in and out.

To assure simultaneous movement of the drum segments 127 and 128 to the same radial extent, the pinions 149 and 150 are desirably driven by axially movable annular racks 161 and 162 contained within the housings 123 and 124, radially inwardly of the pinions 149 and 150 and having a plurality of externally axially spaced teeth thereon in meshing engagement with the teeth of the pinions. The annular racks 161 and 162 are axially slidably supported by the hub portions 120 and 121 of the flanges 118 and 119 and have axial openings 163 and 164 for holding the nuts 113 and 114 on the shaft 110. Nuts 113 and 114 are retained against rotation within the annular racks 161 and 162 whereby rotation of the shoulder drive shaft 110 causes axial movement of the annular racks 161 and 162 and simultaneous turning of all the pinions 149 and 150 for simultaneously turning of and contracting the drum segments 127 and 128.

Referring to FIGS. 3B, 4 and 6, the housing 123 has a key member 167 held in a radially extending slot 168 by a rod 169 and a tongue 170 extending through slot 75 in the drum shaft 8 into a keyway 171 in a sliding sleeve member 175. A tailstock shoulder adjusting rod 176 is connected to the sleeve member 175 by a latch 177 having outwardly swinging dogs 178 for engagement with a circumferential groove 179 in the inner wall of the sleeve member 175. The latch 177 is mounted on the shoulder adjusting rod 176 with a spring 183 biasing the dogs 178 radially inward toward the unlatched position.

A latch rod 184 having a tapered end 185 is disposed within the hollow tailstock shoulder adjusting rod 176 for movement in the axial direction to spread the dogs 178 into the groove 179 to latch the shoulder adjusting rod 176 to the sleeve member 175. As shown in FIG. 3A, the latch rod 184 extends through the tailstock 4 and is connected to a latch rod cylinder piston assembly 186 which may be a double-acting fluid pressure assembly for moving the latch rod in and out of the latch 177 as desired. The latch rod cylinder piston assembly 186 is secured to the shoulder adjusting rod 176 by rods 187 for movement of the cylinder piston assembly with the adjusting rod to limit the piston movement in the cylinder.

A tailstock shoulder adjusting carriage 188 is slidably mounted on the tailstock tube 9 on a sleeve 189 providing for axial movement of the carriage. The sleeve 189 carries a radially extending tongue member 190 extending through a slot 194 in the tailstock tube 9 and into engagement with a key slot 195 in a cylindrical slide 196 within the tailstock tube 9. The cylindrical slide 196 is connected to the shoulder adjusting rod 176 by a pin 197 for movement of the slide with the adjusting rod. The rods 187 connected to the cylinder piston assembly 186 are also fastened to the slide 196.

The carriage 188 has an in-stop 197 slidably mounted on an in-stop adjusting rod 198 which is rotatably mounted on the tailstock assembly 4. As shown more clearly in FIG. 7, the carriage 188 also has an out-stop 199 slidably mounted on an out-stop adjusting rod 200 which is also rotatably mounted in a tailstock assembly 4. The in-stop 197 and out-stop 199 are cylindrical members having threads at the outer surface for engagement with internal threads of nuts 204 and 205 fixedly mounted to the carriage 188. The in-stop 197 and out-stop 199 have internal keys engaged with axial keyways 206 and 207 in the in-stop adjusting rod 198 and out-stop adjusting rod 200 so that upon rotation of the adjusting rods, the in-stop and out-stop will also be rotated and adjusted axially of the carriage. The in-stop adjusting rod 198 and the out-stop adjusting rod 200 have projecting outboard ends 208 and 209 which have flats thereon for receiving a wrench or other tool for turning the rods to obtain the desired adjustment and position of the in-stop 197 and out-stop 199. As shown in FIGS. 3A and 7, an in-stop scale 213 may be mounted on the side of the tailstock housing 4 to indicate the position of the stop by means of a pointer 214 connected by linkage 215 to the in-stop 197. Likewise, an out-stop scale 216 may be mounted on the side of the tailstock housing 4 for indicating the position of the out-stop by a pointer 217 fastened to the out-stop 199.

Referring to FIGS. 1 and 2, a double-acting shoulder hold piston cylinder assembly 220 is mounted on the carriage 188. Piston rod 221 is connected to the tailstock housing 4 for moving the adjusting carriage 188 relative to the tailstock housing between the positions where the in-stop 197 and out-stop 199 limit the movement. As shown in FIG. 7, the out-stop 199 is in engagement with the collar 221 secured to the adjusting rod 200 to prevent further movement of the carriage 188 in the outboard direction. The carriage 188 is in the innermost position with the in-stop 197 in the position shown in chain-dotted lines in FIG. 7 where it abuts the face of the supporting member 222 of the tailstock housing 4.

Referring now to FIG. 3C, a main housing shoulder adjusting carriage 223 is mounted on a sleeve 224 disposed in sliding engagement on the main shaft 46. As shown in FIG. 3B, the carriage 223 is connected through bearings 225 to a collar 226 rotatable with the drum 7. Shoulder adjusting rods 227 are fastened to the collar 226 as by a threaded end and nut for movement of the rods 227 with the collar. Although only one shoulder adjusting rod 227 is shown, more than one may be used as for example, three rods spaced 120° apart around the drum shaft 8. As shown more clearly in FIG. 4, the outboard end of the shoulder adjusting rod 227 is secured to the housing 124 and to a rod 228 extending through the housing so that upon axial movement of the shoulder adjusting rods 227, the housing 124 and the attached drum segments 128 will also be moved axially.

Referring to FIG. 3C, a main housing shoulder hold piston cylinder assembly 231 which may be a double-acting fluid pressure assembly is mounted on the shoulder adjusting carriage 223 and has a piston rod 232 connected to a fixed member 233 of the main housing 2. As shown more clearly in FIG. 7, the main housing shoulder adjusting carriage 223 has an out-stop 234 mounted on an out-stop adjusting rod 235 with a key engaging a longitudinal keyway 236 preventing relative rotation of the out-stop but permitting sliding movement in the axial direction. A collar 237 fixedly mounted on the out-stop adjusting rod 235 is engaged by the out-stop in the "out" position of the carriage 223. An in-stop 238 is slidably mounted on an in-stop adjusting rod 242 with a key of the in-stop in engagement with a longitudinal keyway 243 in the rod to prevent relative rotation but permitting axial movement of the in-stop on the adjusting rod. The in-stop 238 engages a fixed member 244 of the main housing at the "in" position of the carriage 223, as shown in chain-dotted lines in the drawing FIG. 7.

The in-top 238 and out-stop 234 have cylindrical outer surfaces which are threaded for engagement with threaded openings in nuts 245 and 246 fastened to the carriage 223 so that upon rotation of the out-stop adjusting rod 235 and in-stop adjusting rod 242, the stops will be moved axially and assume new positions for limiting the movement of the carriage 223.

In order that the adjustments to the stops and to the movement of the tailstock shoulder adjusting carriage 188 and the main housing shoulder adjusting carriage 223 by symmetrical about the drum 7, the in-stop adjusting rod 198 of the tailstock has a sprocket 247 which is connected by a chain 248, shown in dot-dash lines in FIG. 3A, to a sprocket 249 slidably mounted on an in-stop connecting rod 253 for rotation of the connecting rod when the adjusting rod is turned. The sprocket 249 is keyed to the connecting rod 253 with a key in a longitudinal keyway 254 permitting axial movement of the sprocket when the tailstock housing is retracted for removing the tire as shown in FIG. 1.

The outboard end of the connecting rod 253 is mounted in bearings at the outboard end of the center base assembly 3 and the inboard end is mounted in bearings in the main housing as shown in FIG. 3C. A sprocket 255 is fastened to the inboard end of the connecting rod 253 and connected by a chain 256 to a sprocket 257 mounted on the in-stop adjusting rod 242 of the main housing, as shown in FIG. 7E. The out-stop adjusting rod 200 of the tailstock has a sprocket 257 connected to a sprocket, not shown, of an out-stop connecting rod 258 which is connected in a manner similar to the in-stop connecting rod to a sprocket 259 mounted on the out-stop adjusting rod 237 in the main housing 2.

It can, therefore, be seen that an adjustment of the in-stop adjusting rod 198 by turning the end 208 with a wrench or other tool will turn the sprocket 247 and then in turn, turn the connecting rod 253 which will then cause the main housing in-stop adjusting rod 242 to rotate the same number of turns and in so doing, the tailstock in-stop 204 will be moved toward or away from the drum the same distance as the main housing in-stop 238. It should be noted that the threads on the in-stops 197 and 238 are of opposite hand so that during adjustment when one in-stop is moving axially in one direction the other in-stop will be moving axially in the other direction. This is also true of the out-stop 234 and 199.

Further to FIGS. 1, 2, 3A and 3B, the outer bead setter assembly 12 is connected to the tailstock shoulder adjusting carriage 188 by hydraulic double-acting bead setter cylinder piston assemblies 261 mounted on the carriage 188. In the same manner, hydraulic bead setter cylinder piston assemblies 262 for the inner bead setter assembly 13 are mounted on the main housing shoulder adjusting carriage 223. These cylinders 261 and 262 move the inner bead setter assembly 13 and outer bead setter assembly 12 into engagement with the tire bead during shaping of the tire at which time the shoulder segments 127 and 128 are moved toward the center of the drum 7. As this movement takes place the carriages 188 and 224 also move the same distance toward the center of the drum and carry the inner bead setter assembly 13 and outer bead setter assembly 12 inward without requiring further movement of the pistons in the cylinder piston assemblies 261 and 262.

Brakes having brake shoes 263 for engaging the rotatable outer belt guide 264 of the inner bead setter assembly 13 are provided to limit this rotation when desired. Likewise, brake shoes 265 are actuated by a brake on the outer bead setter assembly 12 for stopping rotation of the rotatable outer belt guide 266 of that bead setter assembly.

Referring to FIG. 3B, the inner bladder turnup assembly 16 is slidably mounted on the drum shaft 8 and moved towards and away from the drum by piston cylinder assemblies 267 mounted on the main housing shoulder adjusting carriage 223 and have pistons rods 268 fastened to the assembly housing 269. Referring to FIG. 3A, the outer bladder turnup assembly 15 is slidably mounted on the tailstock tube 9 and a piston cylinder assembly 270 mounted on the tailstock shoulder adjusting carriage 188 has a piston rod 271 connected to the bladder assembly housing 272 for moving the outer bladder turnup assembly toward and away from the drum 7.

The bladder turnup mechanism, shown in detail in FIGS. 3A, 3B and 4, may be of the type shown and described in copending U.S. application Ser. No. 57,043 filed July 22, 1970, now U.S. Pat. No. 3,692,605, for "Ply Turnup and Sidewall Applying Bladder for Tire Building Machine," filed by Armindo Cantarutti, one of the applicants of this application. Since the bladder turnup mechanism of the outer bladder turnup assembly 15 and inner bladder turnup assembly 16 are substantially the same, only the mechanism for the inner bladder turnup assembly will be described. A bladder turnup assembly 16 desirably consists of a bladder assembly housing 269 having a hub portion 273 axially slidably received on the shaft 8. Rods 227 provide for rotation of the assembly with the drum 7. Air supply rods 274, of which there may be three spaced circumferentially around the drum shaft 8 and main shaft 46, provide communication between a valve block 275 and the air supply. Attached to the annular hub portion 273 adjacent the axially inner end thereof to the left, as shown in FIG. 3B, is a radially extending plate 276 having an axially inwardly opening annular groove 277 in which is retained one of the beads 278 of an annular air bag or bladder 279 by suitable clamping means. The other bead of the inflatable bladder 279 is secured between another annular plate and wedge ring positioned axially outward of the first plate 276. As clearly shown in FIG. 3B, the annular bladder 279 when deflated is substantially flat and has a folded or looped inner marginal portion 283 which is located radially inwardly of the tire bead when the ply turnup mechanism 16 is moved into position adjacent the end of the drum 7. For supporting the annular bladder 279 in such flattened condition, a movable plate 284 has a cylindrical portion 285 surrounding the clearance space between the two plates 276 and 284 and an outer shell or support 286 is also provided around the hub portion 273 for supporting the annular bladder 279 in such flattened condition.

Axial movement of the cylindrical portion 285 between the retracted and extended positions may be accomplished by providing a ring-shaped piston 287 within a ring-shaped chamber 288 between the hub 273 and outer shell 286 and a plurality of circumferentially spaced rods 289 extending between the annular piston ring 287 and the movable plate 284. By alternately venting and pressurizing opposite ends of the annular chamber 288 through suitable ports in the hub 273, the annular ring-shaped piston for movable plate 284 will be caused to move back and forth. During certain phases of the tire building operation, it is desirable to maintain a predetermined air pressure in the outer end of the ring-shaped chamber 288 exerting a force inward towards the drum 7 on the inner marginal portions 283 of the bladder 279 during expansion of the bladder to locate the marginal portion in the most advantageous position for obtaining a tight bead turnup.

OPERATION

Now that the various parts of the tire building machine 1 of the present invention have been described, a typical sequence of operation of the machine will be set forth. Initially, the tire building drum 7 is in the contracted condition as shown in FIGS. 1 and 2, and the tailstock housing 4 is retracted providing a space between the tailstock tube 9 and the drum shaft 8 through which beads B may be inserted and placed in the outer bead setter assembly 12 and inner bead setter assembly 13. The tailstock housing 4 is then moved towards the drum 7 by a hydraulic cylinder with the bearing connecting member 53 on the drum shaft 8 being inserted in the recessed opening 52 of the tailstock tube 9 as shown in FIG. 3A. Also, the latch 177 of the tailstock shoulder adjusting rod 176 will be inserted in the sleeve member 175 and by actuation of the latch rod cylinder piston assembly 186, the latch rod 184 will be moved toward the drum and force the dogs 178 of the latch into engagement with the groove 179 of the sleeve member 175. The outer bladder turnup assembly 15 and the inner bladder turnup assembly 16 are then moved towards the drum 7 by fluid pressure in the piston cylinder assemblies 267 and 270 on the main housing 2 and tailstock housing 4. The magnetic clutch 59 is engaged so that the crown drive shaft 54 will rotate with the main shaft 46 and power is supplied to the main shaft drive motor 18 for rotating the drum 7.

Figure 8:
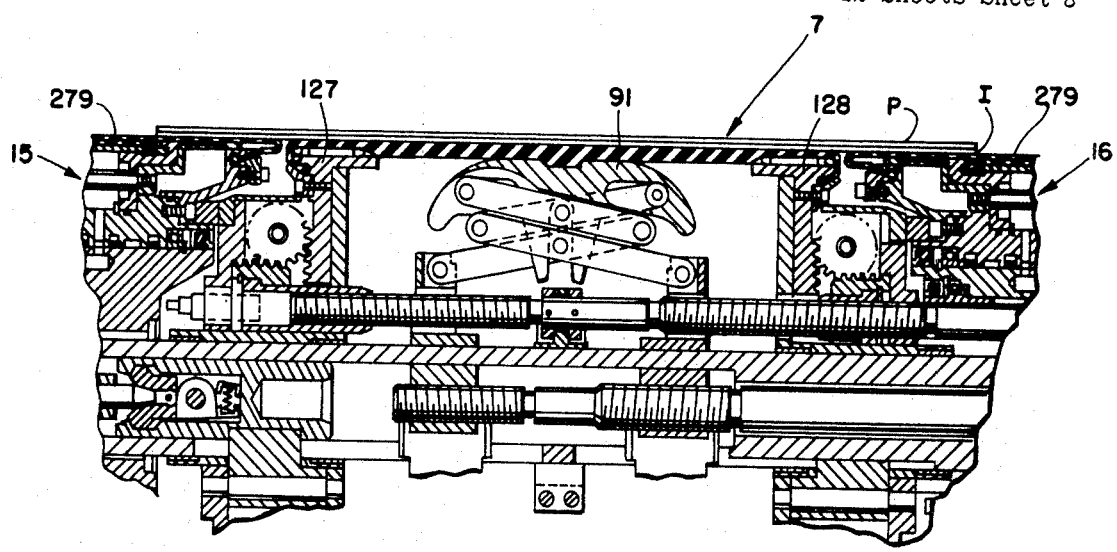

In the preferred sequence illustrated in FIGS. 8–16, an inner liner I and a first ply P are initially wrapped around the drum 7. The ends of the inner liner I and first ply P extend over the bladders 279 of the outer bead setter assembly 12 and inner bead setter assembly 13. As shown in FIG. 8, the outer diameter of the outer bladder turnup assembly 15 and inner bladder turnup assembly 16 are the same as the outer diameter of the drum 7 and provide a firm cylindrical surface on which the inner liner I and first ply P may be stitched by suitable stitching apparatus, not shown. Each of the crown sectors 91 is in the radially contracted position and each of the drum segments 127 and 128 are in the radially contracted position. The shoulder hold position cylinder assemblies 220 and 231 provide fluid pressure exerting forces to bias the shoulder adjusting carriages 188 and 223 away from the drum 7 and move the outstops 199 tnd 234 into the limiting position shown in full lines in FIG. 7.

Figure 9:
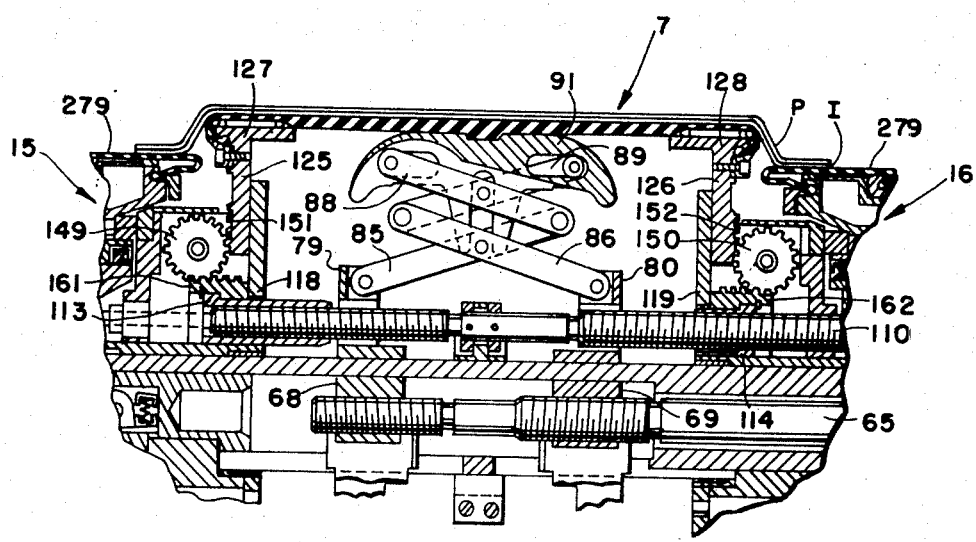

Following application of the inner liner I and first ply P, the drum 7 is expanded to the position shown in FIG. 9 by actuating pneumatic drum brake 49 to stop rotation of the drum and releasing the magnetic clutch 59 after which the crown drive motor 36 is rotated turning the crown drive shaft 54 and crown drive shaft extension 65 in a direction to screw the nuts 68 and 69 towards the center of the drum and thereby move the flanges 79 and 80 towards each other which will expand the inner crossed links 85 and 86 and the outer crossed links 88 and 89 causing radially outward movement of each crown sector 91. It is understood that each sector 91 will be moved radially simultaneously the same distance. Simultaneously, with the rotation of the crown drive motor 36, the shoulder drive motor 26 rotates the shoulder drive shaft 110 in a direction to cause the nuts 113 and 114 to move axially inward towards the center of the drum 7 and carry with them the annular racks 161 and 162 rotating the pinions 149 and 150 causing the radial racks 151 and 152 on the extensions 125 and 126 of the drum segments 127 and 128 to move radially outward until the edges of the annular racks 161 and 162 engage the flanges 118 and 119 of the housings 123 and 124.

During the expansion of the drum 7, the shoulder hold piston cylinder assemblies 220 and 231 hold the outstops 199 and 234 in the outer limiting position so that the shoulder spacing of the drum is maintained. The rotation of the shoulder drive shafts 110 causes radial movement of the drum segments 127 and 128 but does not move them axially.

Figure 10:
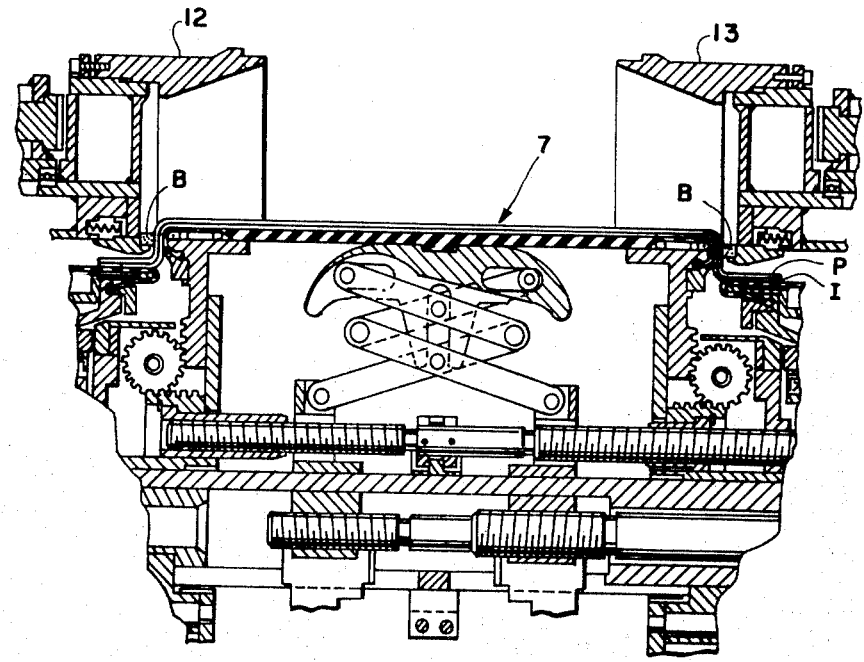
Figure 11:
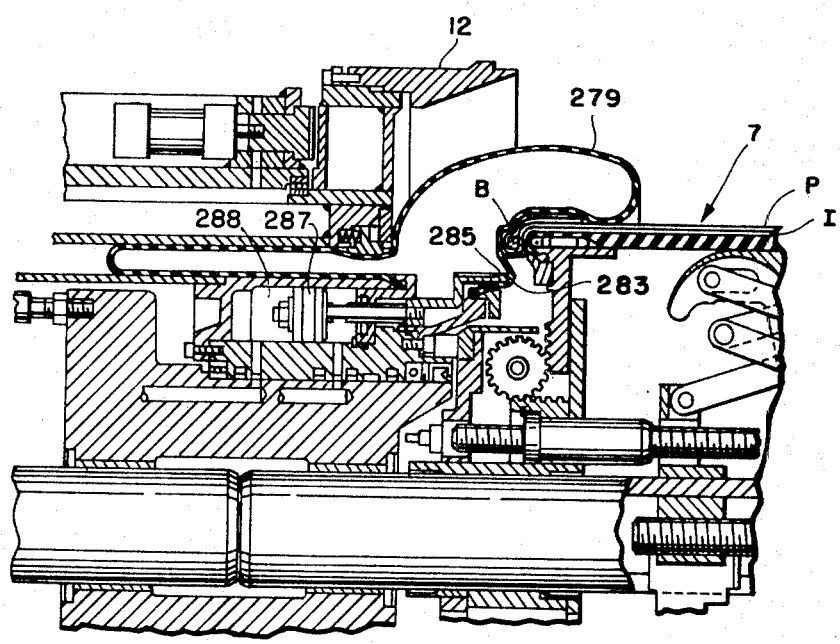

Following the expansion of the drum 7, the ply P and inner liner I may be stitched and then the outer bead setter assembly 12 and inner bead setter assembly 13 are moved axially into engagement with the edges of the drum by fluid pressure in cylinder piston assemblies 261 and 262 so that the beads B are urged into tight engagement with the first ply P as shown in Fig. 10. The inner bead setter assembly 13 and outer bead setter assembly 12 are then retracted from the drum with the beads B adhered to the first ply P by the bead setter cylinder piston assemblies 261 and 262 to a position partially overlapping the bladders 279 of the outer bladder turnup assembly 15 and inner bladder turnup assembly 16. Air is then introduced into the bladders 279 while the bead setter assemblies 12 and 13 are moved toward the drum 7 to a position shown in Fig. 11 where the ends of the inner liner I and first ply P are wrapped around the beads B by the bladders 279.

During this turnup operation, fluid pressure is maintained in the outer portion of the ring-shaped chamber 288 for urging the ring-shaped piston 287 in the cylindrical portion 285 against the inner marginal portion 283 of the bladder 279. This action of the cylindrical portion 285 holds the inner marginal portions 283 so that upon initial expansion they will move radially and thereby urge the inner liner I and first ply P radially into engagement with the inner peripheries of the beads B to provide a tight turnup of the ply and inner liner around the bead.

After the ply turnup, a second ply may be laid on top of the first ply P and the edges turned around the beads B with stitchers of a type well known in the art, if desired. In the manufacture of tires of the type described herein, the first ply P and any other plies have reinforcing cords extending axially of the drum 7 so that in the expanded shaped condition of the tire the cords are so called "radial."

Figure 12:
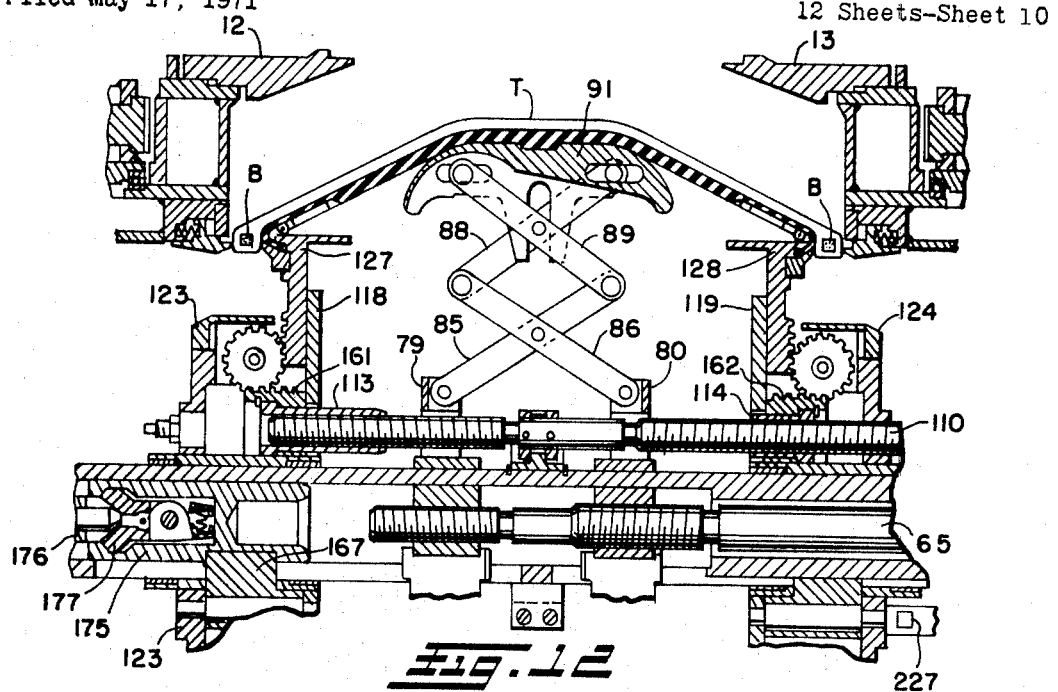

Following the stitching of the plies P and the turnups or turndowns around the beads B, the tire T is shaped in the manner shown in FIG. 12. During the shaping process the outer bead setter assembly 12 and inner bead setter assembly 13 are moved inward toward the drum into contact with the bead portions of the tire by bead setter cylinder piston assemblies 261 and 262. The bead setter assemblies 12 and 13 hold the beads B in position during the shaping process. The shoulder drive shaft 110 and the crown drive shaft 65 are rotated in the same manner as described for the initial expansion of the drum 7; however, the speeds of rotation are carefully controlled at the different crown travel positions from 1 to 4.34 revolutions of the crown drive shaft 54, as shown in FIG. 17. This is done through the crown drive sensing apparatus 41 and shoulder position sensing apparatus 34 which register the speed of rotation of the crown drive and shoulder drive at the different crown travel positions. These positions may be set at every half turn of the crown drive shaft 54; however, other increments may be used for different size tires, as for instance, increments of three-eighths of a turn. As can be seen from the graph of FIG. 17, the initial speed of the crown drive is relatively high and decreases in the latter part of the expansion cycle; whereas the initial speed of the shoulder drive is relatively low and increases at the latter part of the expansion cycle. The purpose of these variable speeds is to maintain a constant bead-to-bead peripheral width during the shaping of the tires to prevent distortion of the plies P and nonuniform spacing circumferentially of the tire. The relationships of these beads can be calculated for the different shapes of tires to provide the precise control desired.

During the shaping operation, the flanges 79 and 80 are moved together at a variable speed which causes the inner links 85 and 86 and the outer links 88 and 89 to expand and move each crown sector 91 at a variable speed in the radial direction.

The shoulder drive shafts 110 meshing with the nuts 113 and 114 drive the annular racks 161 and 162 axially together against the flanges 118 and 119 of the housings 123 and 124 which carry the segments 127 and 128 so that the shoulder segments are moved toward the center of the drum at a speed determined by the speed of rotation of the shoulder drive drive shafts 110. The shoulder adjusting rods 227 are connected to the housing 124 of the drum 7 and also to the main housing shoulder adjusting carriage 223 on which the shoulder hold piston cylinder assembly 231 is actuated to bias the carriage and therefore the shoulder segments 128 in a direction away from the drum 7. However, the force of this piston cylinder assembly 231 is overcome by the forwarding action of the shoulder drive shaft 110 and the carriage 223 is moved from the outer position where the out-stop 234 is in engagement with the collar 237 inward in a direction towards the position shown in chain-dotted lines in FIG. 7, where the in-stop 238 is in abutting relationship with the fixed member 244 of the main housing. The apparatus shown in FIG. 12 is in a position where the carriage 223 is intermediate the limiting position of the out-stop 234 and in-stop 238. This would be a position approximating the crown travel position No. 3 in FIG. 17.

At the tailstock side, the shoulder housing 123 is connected to the sleeve member 175 by key member 167 and then through the latch 177 to the tailstock shoulder adjusting rod 176 which is movable with the tailstock shoulder adjusting carriage 188. The tailstock shoulder holder piston cylinder assembly 220 mounted on the tailstock adjusting carriage 188 is actuated with pressure fluid to urge the carriage away from the drum 7; however, the driving action of the shafts 110 overcome the fluid pressure in the piston cylinder assembly and move the carriage with the housing 123 and shoulder segments 127 toward the center of the drum and this moves the out-stop 199 away from the collar 221 and moves the in-stop 197 towards the position where it engages the tailstock supporting member 222.

Figure 13:
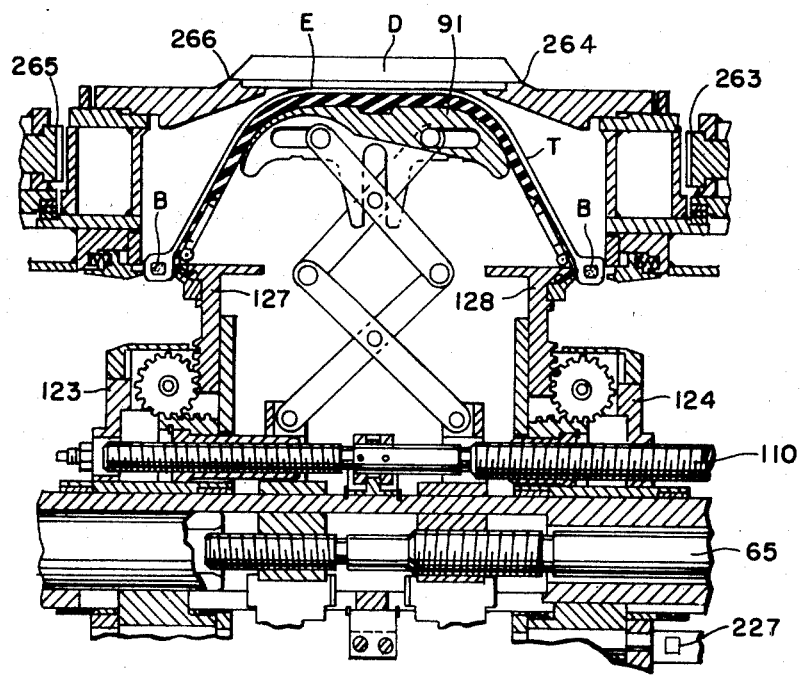

When each crown sector 91 reaches the crown travel position 4.34, as shown in FIG. 17, the shoulder drive shafts 110 will have moved the housings 123 and 124 and the shoulder segments 127 and 128 to positions where the in-stops 197 and 238 abut the fixed members 222 and 244 of the tailstock housing and main housing. The outer belt guides 264 and 266 are then in position for applying the belt E and tread D which may be stitched in place by stitching tools of a type well known in the art. The application of the belt E and tread D is shown in FIG. 13 and it will be noted that the brake shoes 263 and 265 are out of engagement to permit rotation of the belt guides during application of the tread and belts.

Figure 14:
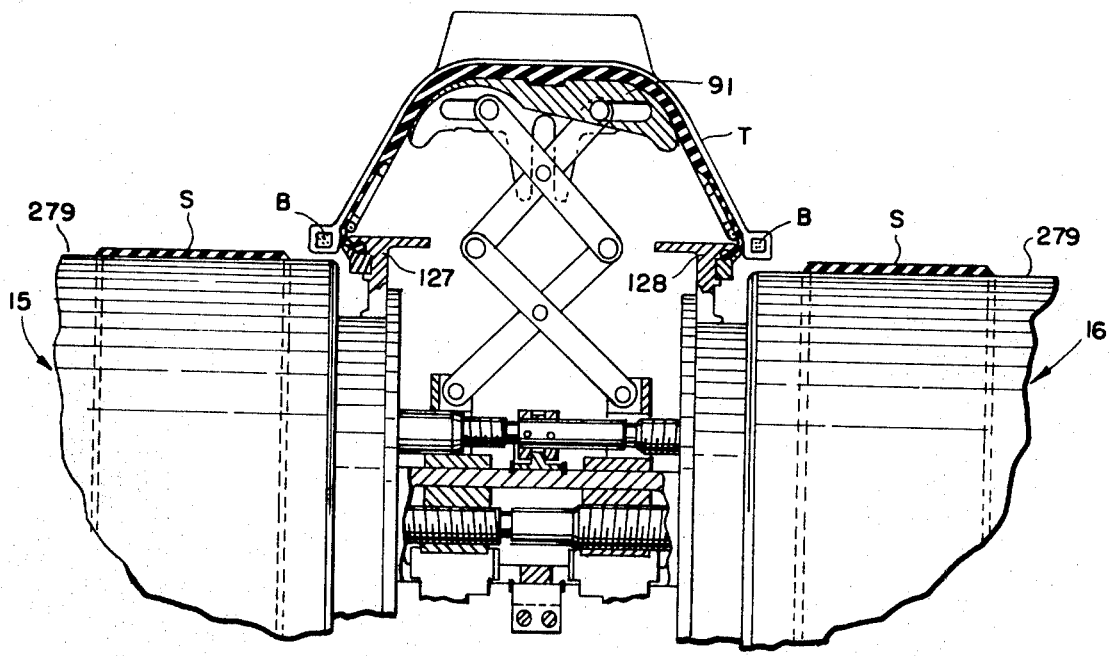
Figure 15:
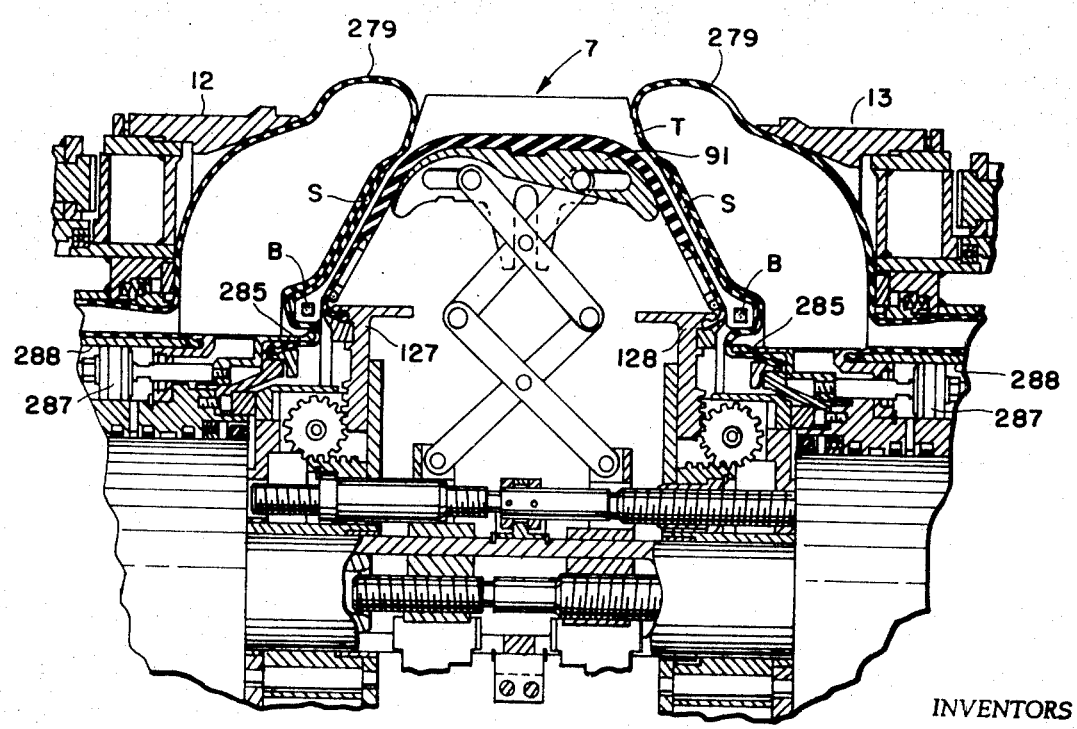

In FIGS. 14 and 15, the application of the sidewall S to the tire after the application of the tread and belt is shown. In FIG. 14, the outer bead setter assembly 12 and inner bead setter assembly 13 have been retracted and sidewalls S applied to the bladders 279 of the bladder turnup assemblies 15 and 16. The bead setter assemblies 12 and 13 are then moved towards the drum 7 and the bladders 279 inflated to turn the sidewalls up and over the sidewalls of the tire T for applying the sidewalls at the proper position. It will be noted that the cylindrical portions 285 of the bladder turnup mechanism have been moved to a position close to the drum 7 by the ring-shaped piston 287 in the ring-shaped chamber 288 in order that the sidewalls S will be placed in precisely the desired position on the tire T. This is shown more clearly in FIG. 15. The sidewalls S may be stitched by conventional stitching tools after the bead setter assemblies 12 and 13 and the bladder turnup bladders 279 have been retracted from the sidewalls.

Figure 16:
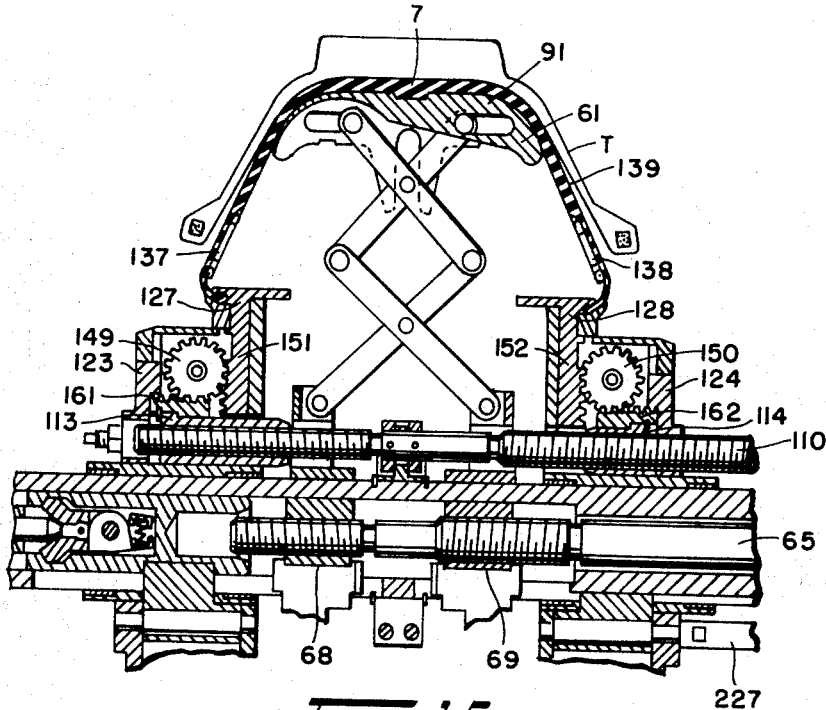

Referring now to FIG. 16, the shoulders of the drum 7 may be contracted to break loose the sides of the drum from the sidewalls of the tire T by radially contracting the shoulder segments 127 and 128 while maintaining each crown sector 91 in the fully expanded condition. To attain this condition, the fluid pressure in the shoulder hold piston cylinder assemblies 220 and 231 is reversed to urge the shoulder adjusting carriages 188 and 223 axially inward towards the drum 7 whereby the housings 123 and 124 are held in the axially innermost position with the in-stop 238 and 197 abutting the tailstock and main housing members 222 and 244. This is the position shown in FIG. 7 in chain-dotted lines. Turning of the shoulder drive shafts 110 in a direction to screw the nuts 113 and 114 in an axially outward direction moves the annular racks 161 and 162 axially outward and thereby turns the pinions 149 and 150 in a direction to drive the radial racks 151 and 152 radially inward for carrying the shoulder segments 127 and 128 radially inward and thereby increasing the sidewall length of the drum cover 136 pulling it away from the sidewall of the tire T. This will minimize the possibility of tread hooking and help break the tire T away from the drum 7. The bifurcated ends 135 and 136 of the steel spring leaves 131 and 132 will slide along the hinged plates 137 and 138 to provide for the increased length of the peripheral surface of the drum 7.

To fully collapse the drum 7 to remove the tire, as shown in FIG. 1, the crown drive shaft 54 and shaft extension 65 are rotated in a direction to move the nuts 68 and 69 outward and therefore retract each crown sector 91 while the shoulder drive shafts 110 are rotated in a direction to move the housings 123 and 124 outward from the drum center. During this operation, the shoulder hold piston cylinder assemblies 220 and 231 are actuated with fluid pressure to resist the movement of the housings 123 and 124 outward; however, this is overcome by the turning action of the shoulder drive shafts 110 until the out-stops 234 and 199 reach the limiting positions in abutment with the collars 221 and 237.

The latch rod cylinder piston assembly 186 is then actuated to move the latch rod 184 away from the drum 7 and from between the dogs 178 of the latch 177 so that the shoulder adjusting rod 176 may be removed from the sleeve member 175 as the tailstock housing 4 is retracted to the position shown in FIGS. 1 and 2. In this position the tire T may be moved off the drum 7 and to a conveyor for transporting to a tire vulcanizer.

From the foregoing it will now be seen that the tire building apparatus of this invention provides for building a radial type tire with precision and is capable of shaping the tire during a one-stage operation in a manner which will not distort the tire or produce nonuniform spacing of the cords in the plies. Control of the shoulder spacing and expansion is also provided with a maximum utilization of the components in the tire building machine and a minimum of additional parts. It will be understood that different size drums may be mounted on this apparatus to accommodate the building of different size tires and by setting the shoulder controlling apparatus and feedback equipment, shaping of many different size tires may be accomplished with the same precision.

The embodiments of the invention in which an exclusive property or privilege is claimed are defined as follows:

1. A tire building drum for shaping and retraction from a tire comprising a crown portion and shoulder portions at each side of said crown portion, said crown portion having radially movable crown sectors and said shoulder portions having axially movable end members for shaping a tire from a substantially cylindrical shape to a toroidal shape, crown drive means for moving said crown sectors radially outward of the drum shoulder drive means for axially moving said end members and shoulder control means varying the speeds of said crown sectors and said end members at predetermined radial positions of said crown sectors for synchronizing the axial movement of said end members with the radially outward movement of said crown sectors whereby the peripheral width of the tire carcass between said end members is maintained substantially constant during the shaping process to provide for uniform spacing of the tire cords circumferentially of the tire.

2. A tire building drum according to claim 1 wherein said shoulder control means includes means for radially contracting said shoulder portions and maintaining said end members in position while said crown sectors are moved radially inward to retract said crown sectors and shoulder portions from a tire built thereon.

3. An expandable tire building drum comprising a crown portion and shoulder portions at each side of said crown portion, said crown portion having radially movable crown sectors and said shoulder portions having axially movable end members for shaping a tire from a substantially cylindrical shape to a toroidal shape, variable speed crown drive means for moving said crown sectors radially outward of the drum and variable speed shoulder drive means for moving said end members axially inward toward said crown portion at predetermined variable speeds of said end members and said crown sectors at predetermined radial positions of said crown sectors whereby the peripheral width of the tire carcass between said end members is maintained substantially constant during the shaping process to provide for uniform spacing of the cords circumferentially of the tire.

4. An expandable tire building drum according to claim 3 wherein said end members comprise radially extending flanges and said shoulder drive means moves said flanges simultaneously in an axial direction and at the same speed toward or away from said crown portion.

5. An expandable tire building drum according to claim 4 wherein said crown sectors are connected to said flanges by flexible resilient spring members covered by an annular body of resilient material providing a drum surface having a firm support against which the plies may be stitched and a uniformly distensible flexible surface for carrying the cords of the plies.

6. An expandable tire building drum according to claim 3 wherein said crown drive means and said shoulder drive means include one central screw and a second screw radially outward of said central screw and rotatable with said drum, said central screw being driven by a first motor and said second screw being driven by a second motor and speed control means connected to said motors for rotation of said screws at predetermined variable speeds to move said end members and crown sectors to properly shape the tire.

7. An expandable tire building drum according to claim 6 wherein said second motor is stationary and connected to said second screw through a ring gear rotatable about the axis of the drum and having internal teeth in engagement with a screw gear mounted on said second screw, said second motor driving said ring gear at a speed different than the speed of the drum to obtain rotation of said second screw or at the same speed as the drum to stop any rotation of said second screw.

8. An expandable tire building drum according to claim 7 wherein said drum is mounted on a cylindrical main shaft, said central screw being rotatably mounted within said main shaft and said second screw being rotatably mounted outside said main shaft with said screw gear in engagement with said ring gear and mounted coaxially of said main shaft.

9. An expandable tire building drum comprising a drum end member, a plurality of circumferentially spaced drum shoulder segments mounted on said end member for radial movement, and means for simultaneously expanding and contracting said shoulder segments to the same extent in response to axial movement of a segment expanding member relative to said end member, shoulder drive means for moving said segment expanding member axially for expansion of said segments and thereafter for axial movement of said end member, and holding means connected to said end member for resisting such axial movement by said shoulder drive means during the radial expansion of said segments and axial movement of said end member.

10. An expandable tire building drum according to claim 9 wherein said holding means further comprises a piston cylinder assembly and fluid pressure actuating means exerting pressure to resist axial movement of said end member.

11. An expandable tire building drum according to claim 9 wherein contraction of said shoulder segments at the fully expanded position of said drum is provided by movement of said segment expanding member in the opposite direction while holding said end member from movement in that direction with said holding means whereby said segments are pulled away from a tire built thereon.

12. An expandable tire building drum according to claim 9 wherein said holding means has stops for limiting the axial movement of said end member.

13. An expandable tire building drum according to claim 12 wherein said stops include an in-stop for limiting the movement of said end member toward the center of the drum and an out-stop for limiting the movement of said end member away from the center of the drum.

14. An expandable tire building drum according to claim 13 wherein said stops are adjustable for accommodating different size tires.

15. An expandable tire building drum according to claim 9 wherein said drum has a drum end member at each end, said shoulder drive means moving said segment expanding member of each drum end simultaneously toward the center or away from the center of the drum to simultaneously expand and contract said segments, and a holding means for each end member operable in opposite directions to resist movement of each said end member.

16. An expandable tire building drum according to claim 15 wherein said holding means for one said end member has adjustable stops to limit the axial movement of that member and said holding means for the other said end member has stops to limit the axial movement of that member and connecting means between said adjustable stops whereby adjustment made to said stops for one end member will be the same as adjustments made to said adjustable stops for the other said end member.

17. An expandable tire building drum according to claim 16 wherein said stops for each said end member comprise a stop for limiting movement of each said end member relative to the center of the drum, each said stop being in threaded engagement with a shaft which is rotatable for adjustment of said stop and said shaft being connected with the other said stop shaft whereby rotation of one stop shaft will rotate the other stop shaft and provide the same adjustment for each said end member.

18. A tire building machine comprising a main housing supporting a drum shaft, a drum assembly mounted on said drum shaft and a retractable tailstock assembly carrying a tailstock tube member for engagement with said drum shaft, said drum assembly having axially movable end members carrying radially movable shoulder segments, shoulder drive means for moving said end members axially of said drum assembly, holding means connected to said end members for resisting movement of said members, said holding means including a first carriage slidably mounted on said tailstock and connected to an outboard end member through said tailstock tube, and a second carriage slidably mounted in said main housing and connected to said inboard end member by rods radially outward of said drum shaft.

19. A tire building machine according to claim 18 wherein said tailstock tube member and said outboard end member are connected by disengageable latch means for resisting movement of said outboard end member in both directions in the latched condition and permitting movement of the tailstock away from said drum assembly in the unlatched condition for removal of the tire and loading of the beads.

20. A tire building machine according to claim 19 wherein said latch means comprises pivotally mounted fingers on said tailstock tube member having distal ends movable radially outward into a circumferential groove in a sleeve of said outboard end member, resilient means for radially contracting said fingers out of engagement with said sleeve and spreading means for radially expanding said fingers into said groove.

21. A tire building machine according to claim 20 wherein said spreading means comprises a rod slidably mounted in said tailstock tube member, fluid pressure means for moving said rod between said fingers for latching said outboard end member to said tailstock tube and for moving said rod away from said fingers whereby said resilient means retracts said fingers and unlatches said outboard end member from said tailstock tube.

22. A tire building machine according to claim 18 wherein said first carriage and said second carriage have stops for limiting the sliding movement of the carriages and thereby limiting the axial movement of said inboard end member and said outboard end member.

23. A tire building machine according to claim 22 wherein said stops are adjustably mounted on said first carriage and said second carriage and include an in-stop for limiting the movement of the carriages toward the center of the drum and an out-stop for limiting the movement of the carriages away from the center of the drum.

24. A tire building machine according to claim 23 wherein said in-stop of said first carriage is connected to said in-stop of said second carriage and said out-stop of said first carriage is connected to said out-stop of said second carriage whereby when one said in-stop is adjusted the other said in-stop is adjusted the same amount and when one said out-stop is adjusted the other said out-stop is adjusted the same amount.

25. A tire building machine according to claim 24 wherein said in-stop and said out-stop on said first carriage are threadedly mounted on a first pair of rotatable shafts and said in-stop and said out-stop of said second carriage are threadedly mounted on a second pair of rotatable shafts, a third pair of shafts extending from said main housing to said tailstock assembly, and said first pair of shafts being connected to said second pair of shafts by said third pair of shafts whereby adjustments to the in-stop and out-stop on said first carriage through rotation of said first pair of shafts will rotate said second pair of shafts and make the same adjustments to said in-stop and out-stop on said second carriage.

26. A tire building machine according to claim 25 wherein said first pair of shafts and said second pair of shafts have sprockets in alignment with sprockets on said third pair of shafts and chains connecting the aligned sprockets to convey the turning adjusting movement of said first pair of shafts to said second pair of shafts.

27. A tire building machine according to claim 18 further comprising an axially movable outboard bead setter assembly and an axially movable inboard bead setter assembly, a first driving connection between said first carriage and said outboard bead setter assembly, a second driving connection between said second carriage and said inboard bead setter assembly, whereby axial movement of said end members while said first bead setter assembly and said second bead setter assembly are in engagement with the tire will not change the condition of said first driving connection and said second driving connection.

28. A tire building machine according to claim 27 wherein said first driving connection is a first piston cylinder assembly and said second driving connection is a second piston cylinder assembly and fluid pressure means are provided for actuating said first and said second piston cylinder assemblies.

29. A tire building machine comprising a main housing supporting a drum shaft, a drum assembly mounted on said drum shaft and a retractable tailstock assembly carrying a tailstock tube member for engagement with said drum shaft, by a disengageable latch means for resisting movement in both directions in the latched condition and permitting movement of the tailstock assembly away from said drum assembly in the unlatched condition for removal of the tire and loading of the beads.

30. A tire building machine according to claim 29 wherein said latch means comprises pivotally mounted fingers on said tailstock tube member having distal ends movable radially outward into a circumferential groove in a sleeve member attached to said drum shaft, resilient means for radially contracting said fingers out of engagement with said sleeve member and spreading means for radially expanding said fingers into said groove.

31. A tire building machine according to claim 30 wherein said spreading means comprises a rod slidably mounted in said tailstock tube member, fluid pressure means for moving said rod between said fingers for latching said sleeve member to said tailstock tube and for moving said rod away from said fingers whereby said resilient means retracts said fingers and unlatches said sleeve member from said tailstock tube.

References Cited
UNITED STATES PATENTS

| | | | |
|---|---|---|---|
| 3,647,598 | 3/1972 | Gazuit | 156—415 |
| 3,547,733 | 12/1970 | Leblond | 156—415 |
| 3,654,025 | 4/1972 | Winzer et al. | 156—415 |
| 1,135,440 | 4/1915 | Gremieu-Javal | 254—122 |
| 1,080,375 | 12/1913 | Senderling | 254—122 |
| 3,654,026 | 4/1972 | Brihkley et al. | 156—420 |
| 3,485,692 | 12/1969 | Frazier | 156—415 X |
| 3,560,302 | 2/1971 | Missioux | 156—415 |
| 3,637,450 | 1/1972 | Bryant | 156—415 |
| 3,409,490 | 11/1968 | Pacciarini et al. | 156—415 |

FOREIGN PATENTS

| | | | |
|---|---|---|---|
| 752,808 | 7/1956 | Great Britain | 156—415 |
| Ad. 4,691 | 1915 | Great Britain | 254—122 |

ALFRED L. LEAVITT, Primary Examiner

C. B. COSBY, Assistant Examiner

U.S. Cl. X.R.

156—127, 129, 132, 133, 401, 403, 418